United States Patent
Hall et al.

(10) Patent No.: US 8,457,554 B2
(45) Date of Patent: Jun. 4, 2013

(54) METHOD AND SYSTEM FOR A CONTINUING SCAN IN A BLUETOOTH WIRELESS SYSTEM

(75) Inventors: Steven Deane Hall, Olivenhain, CA (US); Brima Babatunde Ibrahim, Aliso Viejo, CA (US); Hea Joung Kim, Irvine, CA (US); Yuan Zhuang, San Diego, CA (US); Langford Wasada, Poway, CA (US); Bojko Marholev, Irvine, CA (US); Shawn Ding, San Diego, CA (US); Latha Caliaperoumal, San Diego, CA (US); Satya Prasad Srinivas, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 496 days.

(21) Appl. No.: 11/939,171

(22) Filed: Nov. 13, 2007

(65) Prior Publication Data
US 2009/0124200 A1    May 14, 2009

(51) Int. Cl.
*H04B 7/00* (2006.01)
(52) U.S. Cl.
USPC ........ 455/41.2; 455/185.1; 455/445; 455/574
(58) Field of Classification Search
USPC ........................................ 455/41.2
See application file for complete search history.

(56) References Cited

U.S. PATENT DOCUMENTS

| | | | | |
|---|---|---|---|---|
| 6,005,889 | A * | 12/1999 | Chung et al. | 375/140 |
| 7,398,104 | B2 * | 7/2008 | Yang | 455/552.1 |
| 7,609,751 | B1 * | 10/2009 | Giallorenzi et al. | 375/142 |
| 7,707,297 | B2 * | 4/2010 | Haddad | 709/229 |
| 7,848,720 | B2 * | 12/2010 | Tan | 455/185.1 |
| 2004/0185857 | A1 * | 9/2004 | Lee et al. | 455/445 |
| 2005/0164642 | A1 * | 7/2005 | Roberts | 455/67.13 |
| 2006/0128308 | A1 * | 6/2006 | Michael et al. | 455/41.2 |
| 2008/0010040 | A1 * | 1/2008 | McGehee | 702/189 |
| 2008/0026718 | A1 * | 1/2008 | Wangard et al. | 455/266 |
| 2008/0058031 | A1 * | 3/2008 | Deprun | 455/574 |
| 2009/0046763 | A1 * | 2/2009 | Kerai | 375/136 |

FOREIGN PATENT DOCUMENTS
WO    WO 2006013310 A1 *    2/2006

* cited by examiner

*Primary Examiner* — Ajibola Akinyemi
(74) *Attorney, Agent, or Firm* — Thomas|Horstemeyer, LLP.

(57) ABSTRACT

Methods and systems for wireless communication are disclosed and may include controlling one or more scans of a received signal detection frequency across a frequency range and storing a magnitude of the received signal at each frequency where the magnitude exceeds a threshold level. A type of one or more signals in the received signal may be determined based on a bandwidth of the signals. A Bluetooth page/inquiry scan may be initiated if the determined type is a page/inquiry signal, and scans may be continued if the determined type may not be a page/inquiry signal. The scans may be repeated on a periodic basis and may be controlled utilizing a voltage controlled oscillator. Each of the scans may include a plurality of discrete frequency steps or a continuous frequency ramp. The controlling may include a start frequency, an end frequency and a frequency step size for the scans.

21 Claims, 5 Drawing Sheets

METHOD AND SYSTEM FOR A CONTINUING SCAN IN A BLUETOOTH WIRELESS SYSTEM

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for a continuing scan in a Bluetooth wireless system.

BACKGROUND OF THE INVENTION

As mobile, wireless, and/or handheld portable devices increasingly become multifunctional, "all-in-one," communication devices, these handheld portable devices include an increasingly wide range of functions for handling a plurality of wireless communication services. For example, a single handheld portable device may enable Bluetooth communications and wireless local area network (WLAN) communications.

Much of the front end processing for wireless communications services is performed in analog circuitry. Front end processing within a portable device may comprise a range of operations that involve the reception of radio frequency (RF) signals, typically received via an antenna that is communicatively coupled to the portable device. Receiver tasks performed on an RF signal may include downconversion, filtering, and analog to digital conversion (ADC), for example. The resulting signal may be referred to as a baseband signal. The baseband signal typically contains digital data, which may be subsequently processed in digital circuitry within the portable device.

Front end processing within a portable device may also include transmission of RF signals. Transmitter tasks performed on a baseband signal may include digital to analog conversion (DAC), filtering, upconversion, and power amplification (PA), for example. The power amplified, RF signal, is typically transmitted via an antenna that is communicatively coupled to the portable device by some means. The antenna utilized for receiving an RF signal at a portable device may or may not be the same antenna that is utilized for transmitting an RF signal from the portable device.

The analog RF circuitry for each separate wireless communication service may be implemented in a separate integrated circuit (IC) device (or chip). This may result in increased chip and/or component count that may limit the extent to which the physical dimensions of the portable device may be miniaturized. This may result in physically bulky devices, which may be less appealing to consumer preferences.

Along with increased chip and/or component count, there may also be a corresponding rise in power consumption within the portable device. This may present another set of disadvantages, such as increased operating temperature, and reduced battery life between recharges.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a continuing scan in a Bluetooth wireless system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a continuing scan in a Bluetooth wireless system. Exemplary aspects of the invention may comprise controlling one or more scans of a received signal detection frequency across a frequency range and storing a magnitude of the received signal at each frequency where the magnitude exceeds a threshold level. A type of one or more signals in the received signal may be determined based on a bandwidth of the signals. A Bluetooth page/inquiry scan may be initiated if the determined type is a page/inquiry signal, and scans may be continued if the determined type is not a page/inquiry signal. The scans may be repeated on a periodic basis and may be controlled utilizing a voltage controlled oscillator. Each of the scans may comprise a plurality of discrete frequency steps or a continuous frequency ramp. The controlling may comprise a start frequency, an end frequency and a frequency step size for the scans.

Figure 1:
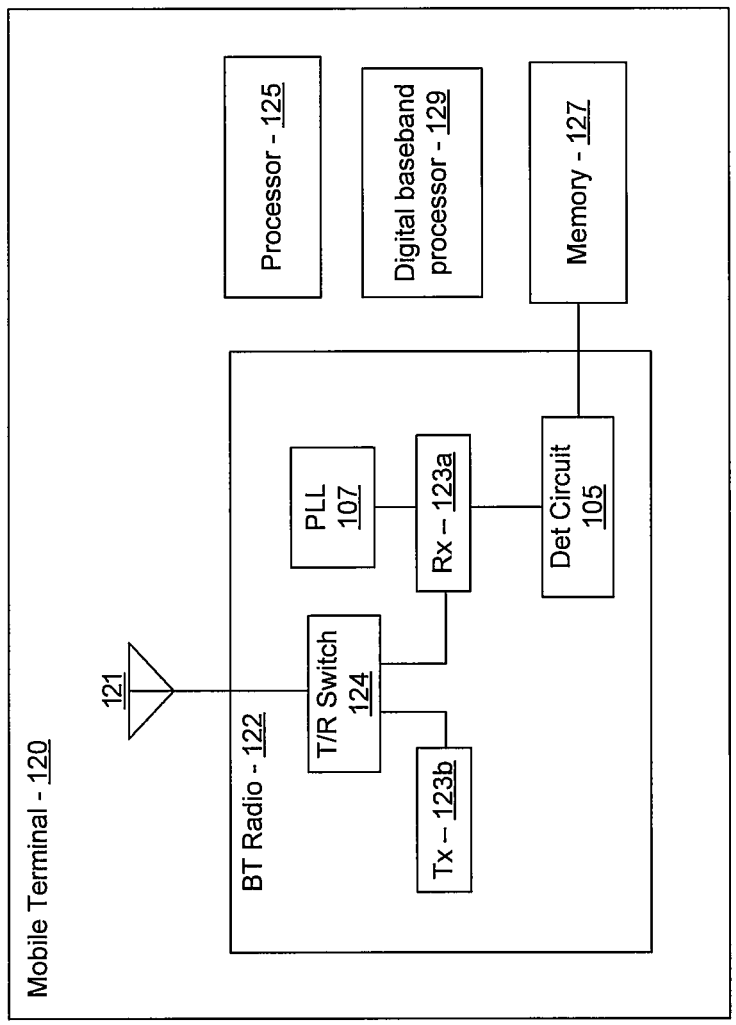
FIG. 1 is a block diagram illustrating an exemplary mobile terminal that comprises a Bluetooth radio, in accordance with an embodiment of the invention.

FIG. 1 is a block diagram illustrating an exemplary mobile terminal that comprises a Bluetooth radio, in accordance with an embodiment of the invention. Referring to FIG. 1, there is shown mobile terminal 120 that may comprise a Bluetooth (BT) radio 122, a BT digital baseband processor 129, a processor 125, and a memory 127. The BT radio 122 may comprise a BT Receiver (Rx) 123a, a BT Transmitter (Tx) 123b, a detection circuit 105, a phase locked loop (PLL) 107 and a T/R switch 124. In various embodiments of the invention, the BT Rx 123a, the PLL 107, the detection circuit 105 and the BT Tx 123b may be integrated into a BT radio 122, for example. A single transmit and receive antenna 121 may be communicatively coupled to the BT Rx 123a and the BT Tx 123b. A T/R switch 124, or other device having switching capabilities may be coupled between the BT Rx 123a and BT Tx 123b, and may be utilized to switch the antenna 121 between transmit and receive functions.

The BT Rx 123a may comprise suitable logic, circuitry, and/or code that may enable processing of received BT RF signals. The BT Rx 123a may be communicatively coupled to the T/R switch 124 and may enable reception of RF signals in frequency bands utilized by BT communication systems.

The detection circuit 105 may comprise suitable circuitry, logic and/or code that may enable sensing signals received via the antenna 121 and the T/R switch 124. The detection circuit 105 may enable measurement of the received signal strength indication (RSSI) for determining the signal level profile received by the BT radio 122. The detection circuit 105 may be enabled to store the signal level profile in the memory 127.

The PLL 107 may comprise suitable circuitry, logic and/or code that may enable frequency tuning the BT Rx 123a. The PLL 107 may be utilized to lock the BT Rx 123a to a desired frequency channel, and may be tuned by adjusting a voltage controlled oscillator (VCO) within the PLL 107. The PLL 107 may be operated in open-PLL mode to scan across a frequency band to determine a signal level profile of a received signal.

The BT digital baseband processor 129 may comprise suitable logic, circuitry, and/or code that may enable processing and/or handling of BT baseband signals. In this regard, the BT digital baseband processor 129 may process or handle BT signals received from the BT Rx 123a and/or BT signals to be transferred to the BT Tx 123b for transmission via a wireless communication medium.

The BT digital baseband processor 129 may also provide control and/or feedback information to/from the BT Rx 123a, the BT Tx 123b and the detection circuit 105, based on information from the processed BT signals. The BT digital baseband processor 129 may communicate information and/or data from the processed BT signals to the processor 125 and/or to the memory 127. Data stored in the memory 127 may comprise one or more signal level profiles generated by scanning the BT RX 123a over a frequency range and measuring the received signal. Moreover, the BT digital baseband processor 129 may receive information from the processor 125 and/or the memory 127, which may be processed and transferred to the BT Tx 123b for transmission of BT signals via the wireless communication medium.

The BT Tx 123b may comprise suitable logic, circuitry, and/or code that may enable processing of BT signals for transmission. The BT Tx 123b may be communicatively coupled to the T/R switch 124 and the detection circuit 105, and may enable transmission of RF signals in frequency bands utilized by BT systems.

The processor 125 may comprise suitable logic, circuitry, and/or code that may enable control and/or data processing operations for the mobile terminal 120. The processor 125 may be utilized to control at least a portion of the BT Rx 123a, the BT Tx 123b, the detection circuit 105, the BT digital baseband processor 129, and/or the memory 127. In this regard, the processor 125 may generate at least one signal for controlling operations within the mobile terminal 120.

The memory 127 may comprise suitable logic, circuitry, and/or code that may enable storage of data and/or other information utilized by the mobile terminal 120. For example, the memory 127 may be utilized for storing processed data generated by the BT digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the BT Rx 123a to enable receiving BT signals in the appropriate frequency band, and storing the signal level versus frequency. In this manner, the source of received signals may be determined since the profile of a signal may indicate the type of wireless signal. For example, a narrow bandwidth signal in the BT frequency band may comprise a page/inquiry signal, and a wider bandwidth profile may comprise a WiFi signal.

In operation, the BT Rx 123a and the BT Tx 123b may be enabled to receive and transmit BT signals, respectively. The BT Rx 123a may be enabled to sweep the BT reception frequency in a step-wise or continuous fashion across the entire BT frequency band, and/or a subset thereof. The PLL 107 may be run in an open loop mode, in which the PLL 107 is not allowed to lock on each frequency. Running the PLL 107 in an open loop mode allows the speed of the scan to be increased. The detection circuit 105, via the BT Rx 123a, may measure the received signal strength indicator (RSSI) versus frequency.

In a BT system, a frequency sweep may be performed on a regular basis, every millisecond for example, to determine if a BT page/inquiry signal may be present. A BT page signal may comprise a request from a BT device to connect to another specific BT device, whereas a BT inquiry signal may comprise a request to determine what BT devices may be present.

Each frequency sweep may comprise a plurality of scans performed sequentially within a time frame such that a BT page/inquiry signal may be detected. For example, if each individual scan takes 68 microseconds, and the total scanning time may be 937.5 microseconds, the number of frequency scans with one frequency sweep may be 14. These frequency sweeps comprising a plurality of repeated frequency scans may be performed on a regular basis, every 1.28 or 2.56 seconds, for example.

The RSSI versus frequency data that may be stored in the memory 127 may be utilized to determine the source of various wireless signals received by the BT radio 122. In conventional systems, a scan may be performed and then stopped when a signal is detected, causing the system to go into a normal page/inquiry scanning mode.

In an embodiment of the invention, the frequency scan may continue even after a signal is detected such that the signal level versus frequency profile may be determined. In this manner, the type of wireless signal may be determined. For example, in instances when a relatively narrow bandwidth signal, indicating a BT page/inquiry signal, a normal page/inquiry scan may then be initiated. In instances where the signal profile may have a wider bandwidth, such as a WiFi interferer signal, this signal detection may be ignored, and the scanning may continue.

Since BT page/inquiry scans may require significant power from a BT system, performing a page/inquiry scan only when an actual page/inquiry signal may be present, as opposed to interferer signals, for example, greater power efficiency in a BT device such as the BT radio 122 may be realized.

Figure 2A:
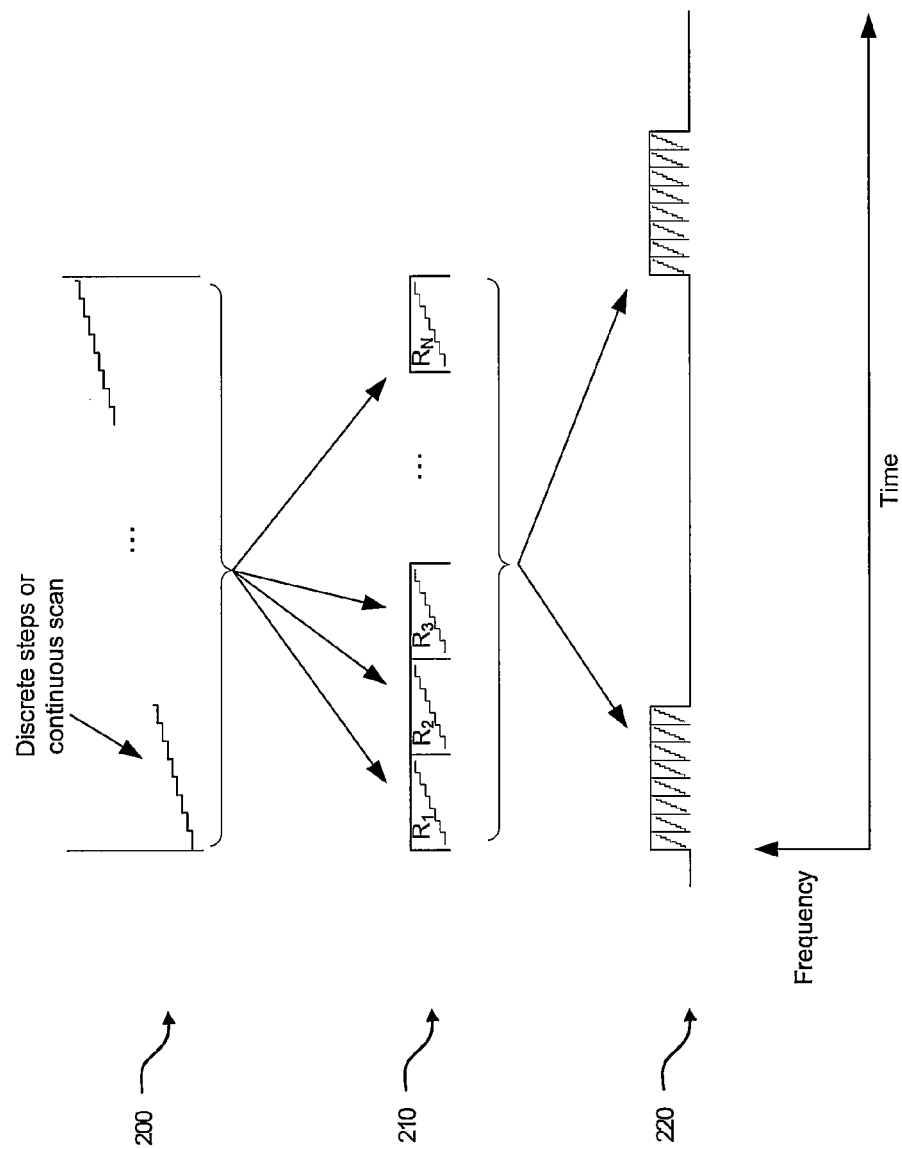
FIG. 2A is a block diagram illustrating exemplary frequency scans in a BT radio, in an embodiment of the invention.

FIG. 2A is a block diagram illustrating exemplary frequency scans in a BT radio, in an embodiment of the invention. Referring to FIG. 2A, there is shown a single frequency scan vs. time plot 200, a frequency sweep plot 210 and a periodic frequency sweep plot 220. The single frequency scan vs. time plot 200 may comprise a frequency sweep of the PLL 107 described with respect to FIG. 1, and may comprise a series of frequency steps or a continuous frequency sweep. The time for the signal frequency scan may be fast enough that a plurality of individual scans may be performed in a frequency sweep, such as less than 68 microseconds, for example.

The frequency sweep plot 210 may comprise a plurality of individual frequency scans. The number of individual scans N may be determined by the time required to perform each individual scan, and the total time allowed for the frequency sweep. For example, in instances where the frequency sweep may be equal to 1050 microseconds, and the individual scans may be equal to 70 microseconds, the number of individual scans, N, may be equal to 15. In an exemplary embodiment of the invention, the frequency sweep may be greater than or equal to 937.5 microseconds and the individual scans may be less than or equal to 68 microseconds, for example.

The periodic frequency sweep plot 220 may comprise a plurality of frequency sweeps, each sweep repeated after a predetermined time frame. The frequency sweeps may be repeated every 1.28 or 2.56 seconds, for example. In instances when a signal may be received during a frequency scan, the frequency scan may continue over the entire frequency range to determine the signal profile versus frequency. In another embodiment of the invention, the scan may continue only as long as needed to distinguish between a BT signal from a WiFi signal, for example, which may comprise an extra 5 MHZ scan. In instances when a received signal may indicate a BT page/inquiry signal, a relatively narrow bandwidth, for example, a BT page/inquiry scan may be initiated in the BT radio 122, described with respect to FIG. 1. In instances where a received signal may comprise an interferer, such as a wider bandwidth WiFi signal, for example, the frequency scans may be continued until the N frequency scans in a full frequency sweep have completed, or until a BT page/inquiry signal may be detected.

Figure 2B:
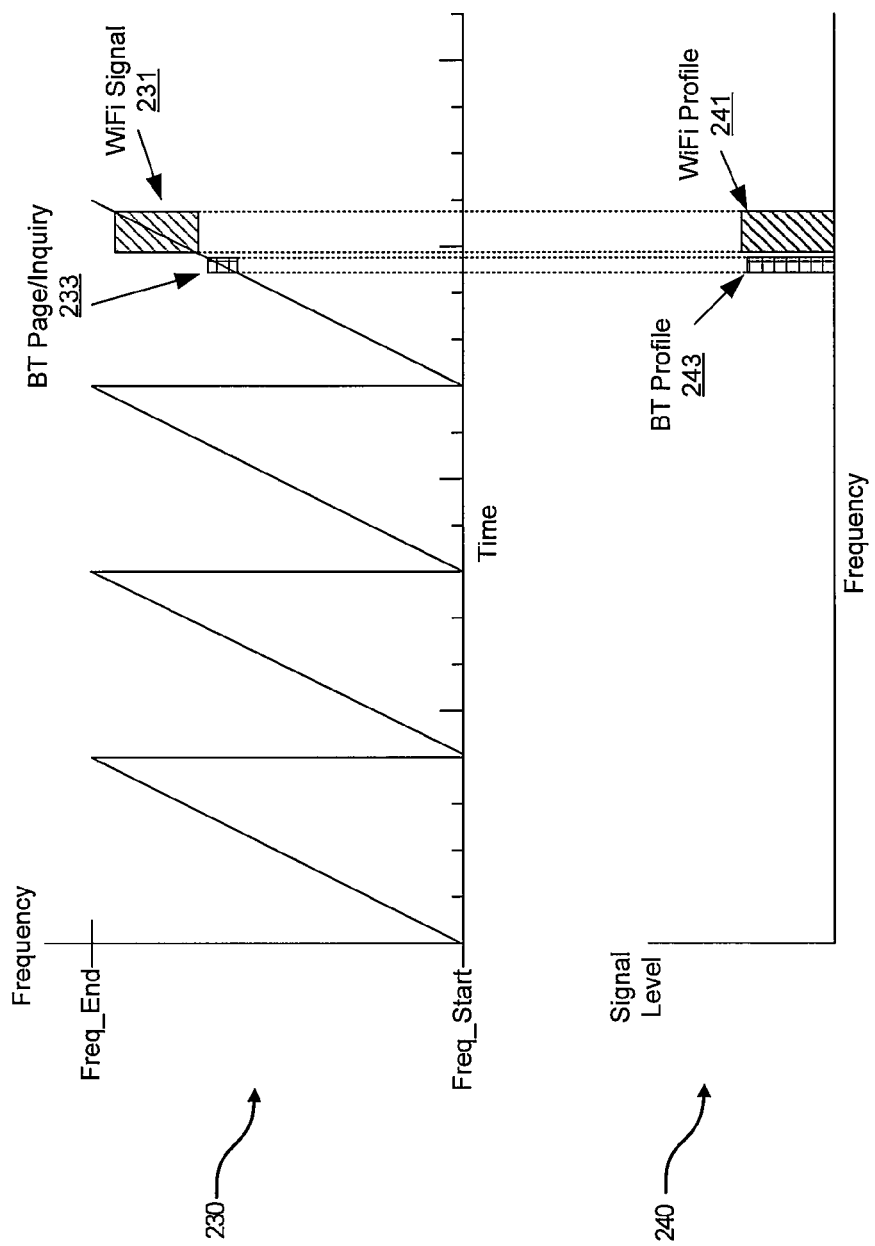
FIG. 2B is a block diagram of an exemplary signal profile frequency scan, in accordance with an embodiment of the invention.

FIG. 2B is a block diagram of an exemplary signal profile frequency scan, in accordance with an embodiment of the invention. Referring to FIG. 2B, there is shown a frequency scan 230 and a signal profile 240. The frequency scan 230 may comprise a frequency scan versus time plot illustrating the change of frequency of the PLL 107, described with respect to FIG. 1. There is also shown a WiFi signal 231, a BT page/inquiry signal 233, a WiFi profile 241 and a BT page/inquiry profile 243.

The width of the WiFi signal 231 and the BT page/inquiry signal 233 in the vertical direction of the frequency scan 230 may correspond to the bandwidth of the signals, where a signal was detected in those frequency ranges. By measuring the signal level across the entire frequency range, the signal level profile for any received signals may be generated, as shown in the signal profile 240, and may be stored in the memory 127, as described with respect to FIG. 1. The WiFi signal 231 and BT page/inquiry signal 233 shown in the frequency scan 230 may correlate to the WiFi profile 241 and the BT profile 243, respectively, in the signal profile 240. In this manner, the frequency signal profile 240 may be utilized to determine the types of signals received, thus allowing the system to only initiate a BT page/inquiry scan when a BT page/inquiry signal may be present, significantly reducing power consumption.

Figure 3:
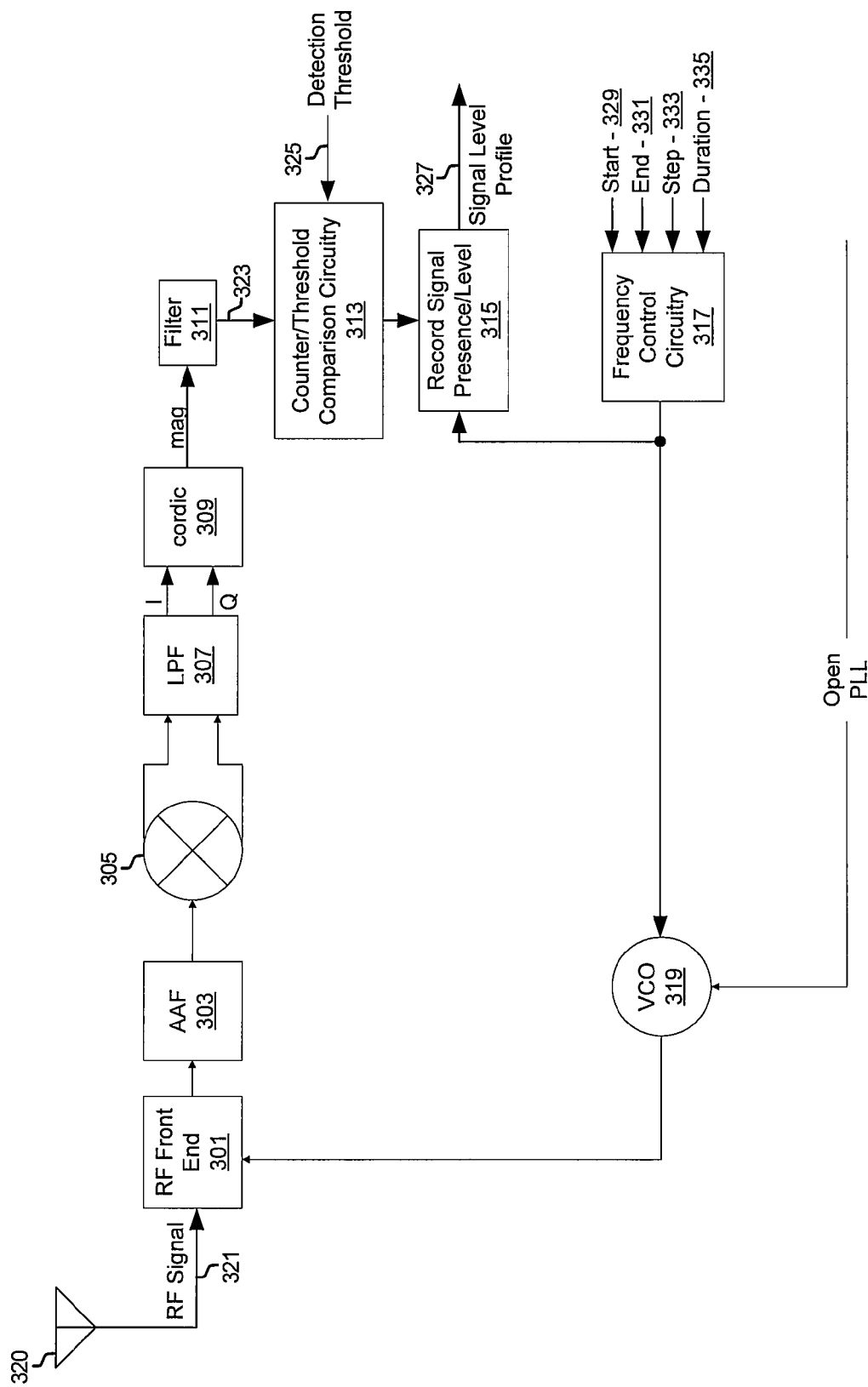
FIG. 3 is a block diagram illustrating a signal profile detection system, in accordance with an embodiment of the invention.

FIG. 3 is a block diagram illustrating a signal profile detection system, in accordance with an embodiment of the invention. Referring to FIG. 3, there is shown an RF front end 301, an anti-aliasing filter (AAF) 303, a mixer 305, a low pass filter LPF 307, a coordinate rotation digital computer (cordic) 309, a filter 311, counter/threshold comparison circuitry 313, a signal profile storage block 315, a frequency control block 317, a voltage controlled oscillator (VCO) 319 and an antenna 320. There is also shown a received RF signal 321, a filtered magnitude signal 323, a reference threshold level 325, a signal level profile 327, a start frequency 329, an end frequency 331, a frequency step 333 and a frequency sweep duration 335.

The RF front end 301 may comprise suitable circuitry, logic and/or code that may enable the reception of RF signals. The RF front end 301 may comprise amplification stages, for example, and may be communicatively coupled to the antenna 320, the AAF 303 and the VCO 319. In an embodiment of the invention, the RF front end 301 may comprise frequency down-conversion capability, such as from a mixer, for example, and may down-convert the frequency of the received RF signal 321 to IF. The RF front end 301 may receive as an input, an RF signal communicated from the antenna 320 and generate an amplified IF output signal that may be communicated to the AAF 303. The RF front end 301 may also receive input signals from a baseband processor, such as the baseband processor 129 or the processor 125, described with respect to FIG. 1, that may be utilized to set the gain in gain stages in the RF front end 301.

The AAF 303 may comprise suitable circuitry, logic and/or code that may enable filtering of the signal received at its input. The AAF 303 may comprise a band pass filter that may cover the bandwidth of the Bluetooth frequency range, or in an alternative embodiment may comprise a low pass filter, with a corner frequency higher that the Bluetooth maximum frequency.

The mixer 305 may comprise suitable circuitry, logic and/or code that may enable down-conversion of the frequency of a received signal to a frequency that may be equal to the difference of the received signal and that of another input signal, which may be supplied by a local oscillator, for example. In an embodiment of the invention, the mixer 305 may be enabled to generate in-phase and quadrature (I and Q) output signals from the received signal.

The LPF 307 may comprise suitable circuitry, logic and/or code the may enable filtering received analog signals. The LPF 307 may be enabled to receive an input signal, pass signals below a determined cutoff frequency, and attenuate signals with frequencies above the cutoff frequency before communicating the filtered signal to the cordic 309. In this manner, a lower frequency modulation signal may pass through the LPF 307, while a higher frequency carrier signal may be attenuated, for example.

The cordic 309 may comprise suitable circuitry, logic and/or code the may enable the generation of a magnitude signal from received I and Q signals. The cordic 309 may comprise an efficient and high speed calculation block, that may only require addition, subtraction, bit shift and table lookup to perform more complex mathematical functions. The input signals received by the cordic 309 may comprise the I and Q output signals generated by the LPF 307, and as such, the cordic 309 may utilize trigonometric function algorithms to determine magnitude and phase signals. Since the calculation functions in the cordic 309 may be shared, it may be utilized in a plurality of functions in a BT system, such as in demodulation, for example. The magnitude output signal of the cordic 309 may be communicatively coupled to the filter 311.

The filter 311 may comprise suitable circuitry, logic and/or code that may enable filtering of an input signal during a scan of the BT frequency band. The filter 311 may reduce noise spikes in the signal received from the cordic 309 and generate a filtered magnitude signal 323 that may be communicatively coupled to the counter/threshold comparison circuitry 313.

The counter/threshold comparison circuitry 313 may comprise suitable circuitry, logic and/or code that may enable comparing the magnitude of a received signal to a reference threshold level 325, and enabling the storage of the magnitude of the signal in the signal profile storage block 315 when above the reference threshold level 325. The counter/threshold comparison circuitry 313 may receive as an input, a signal generated by the filter 311, and may generate an output signal that may be communicatively coupled to the signal profile storage block 315.

The signal profile storage block 315 may comprise suitable circuitry, logic and/or code that may enable storage of the signal profile as determined by the counter/threshold comparison circuitry 313 over the BT frequency band. The signal profile storage block 315 may be communicatively coupled to one or more processors such as the processor 125 and the digital baseband processor 129, described with respect to FIG. 2.

The frequency control block 317 may comprise suitable circuitry, logic and/or code that may enable controlling the frequency scan performed by the VCO 319. The frequency control block 317 may receive as inputs, the start frequency 329, the end frequency 331, the frequency step size 333, and the frequency sweep duration 335. These inputs may define the parameters of the frequency scans and sweeps, as described with respect to FIG. 2A and FIG. 2B. The frequency control block may utilize the input signals to generate an output voltage that may control the frequency of the VCO 319.

The VCO 319 may comprise suitable circuitry, logic and/or code that may enable the generation of an output signal at a desired frequency that may be dependent on an input voltage. The VCO 319 may receive as an input, a control voltage generated by the frequency control block 317 and generate an output signal at a frequency defined by the received input voltage. The VCO 319 may be a component of a phase locked loop (PLL), such as the PLL 107, described with respect to FIG. 1, which may communicate a feedback signal that may be utilized to lock the VCO 319 at a desired frequency. In an embodiment of the invention, the VCO 319 may be operated in open PLL mode, where no feedback signal may be communicated to the VCO 319.

In operation, the VCO 319 may be utilized to sweep the frequency utilized by the RF front end 301 to down-convert the received RF signal 321 and communicate the down-converted signal to the AAF 303. The VCO 319 may be run in open loop mode, to increase the speed of the sweep, and may receive as an input, an input voltage generated by the frequency control block 317. The frequency control block 317 may receive the input signals the start frequency 329, the end frequency 331, the step size 333, and the duration 335 to control the VCO 319.

The AAF 303 may filter the signal received from the RF front end 301 and generate an output that may be communicated to the mixer 305. The mixer 305 may down-convert the received signal to baseband frequencies, and may generate I and Q signals.

The generated I and Q output signals may be communicatively coupled to the LPF 307, which may further filter the signals before communicating filtered I and Q signals to the cordic 309. The cordic 309 may generate phase and magnitude signals from the I and Q signals and may communicate the magnitude signal to the filter 311. The utilization of the cordic 309 to determine a magnitude from I and Q signals is an exemplary embodiment. In another embodiment of the invention, the presence of a signal may be determined by measuring the magnitude or the power of the RF signal 321 at a point prior to the mixer 305.

The filter 311 may filter the magnitude signal and generate an output signal that may be communicated to the counter/threshold comparison circuitry 313. The counter/threshold comparison circuitry 313 may compare the filtered magnitude signal to a threshold value, the reference threshold level 325, to determine the presence of a signal. The threshold value may be temperature dependent, and may be adjusted accordingly by a processor, such as the processor 125 or the digital baseband processor 129, described with respect to FIG. 1.

In instances when the counter/threshold comparison circuitry 313 may determine that the filtered magnitude or power signal is above the reference threshold level 325, this may indicate that a signal has been received by the RF front end 301. While conventional systems may stop the frequency sweep at this time to initiate a BT page/inquiry scan, in an embodiment of the invention, the measured signal level may be stored in the signal profile storage block 315 and the frequency scan may continue. The signal profile stored in the signal profile storage block 315 may be utilized to determine the type or types of signals received. In instances where a wide-band signal, such as a WiFi interferer, may be received, the frequency scans and frequency sweeps described with respect to FIG. 2A and FIG. 2B may continue. However, in instances when a narrower-band signal, indicating a BT page/inquiry signal, may be received, a BT page/inquiry scan may be initiated to establish communication with the source of the BT page/inquiry signal.

Figure 4:
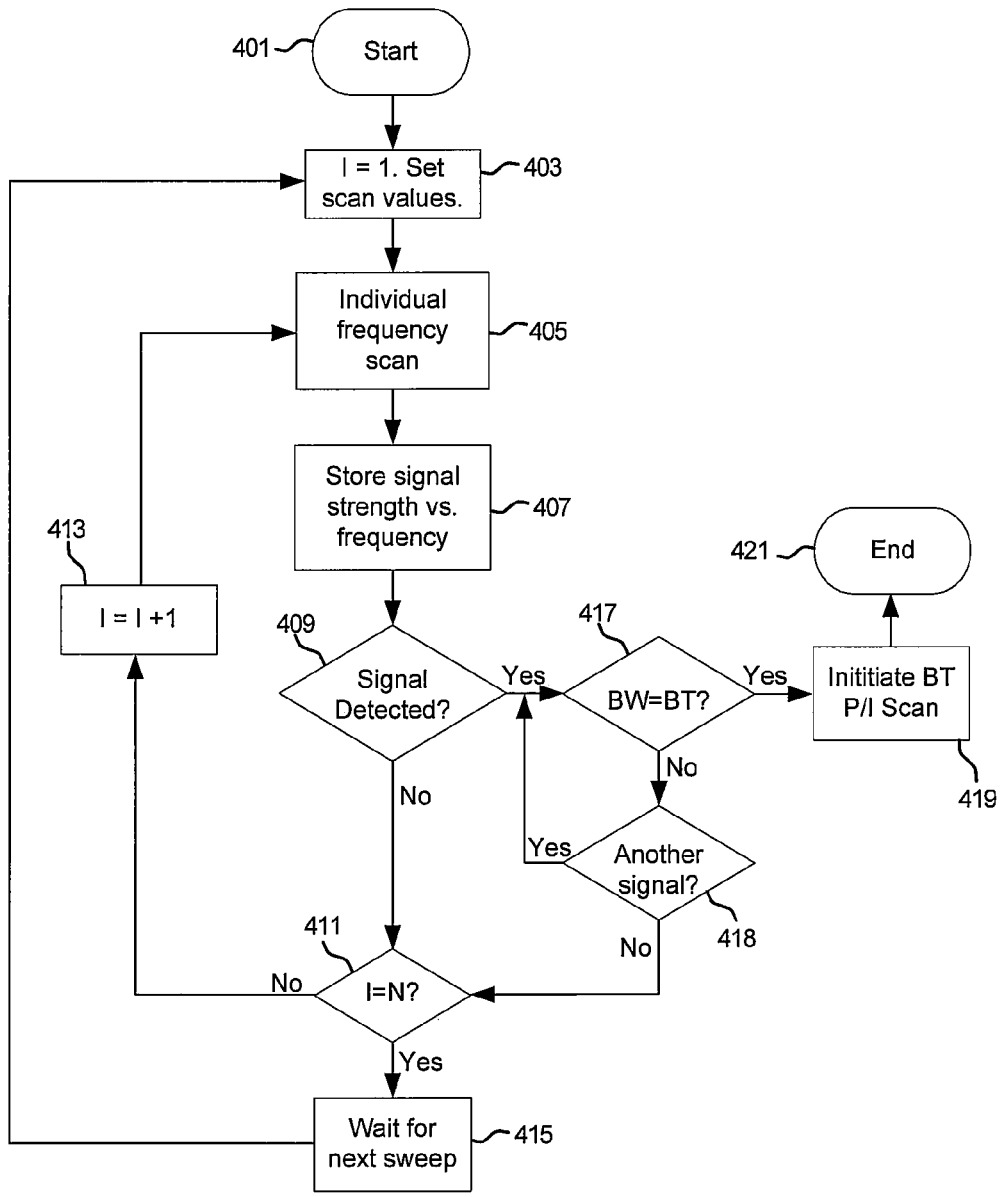
FIG. 4 is a flow diagram illustrating an exemplary Bluetooth frequency sweep process, in accordance with an embodiment of the invention.

FIG. 4 is a flow diagram illustrating an exemplary Bluetooth frequency sweep process, in accordance with an embodiment of the invention. Referring to FIG. 4, in step 403, after start step 401, a counter value, I, may be set to 1, and frequency scan parameters, such as frequency start, stop and step values may be set before proceeding to step 405. In step 405, a frequency scan may be performed from the frequency scan parameters set in step 403, followed by step 407, where the signal strength versus frequency data may be stored. In step 409, the stored signal profile may be utilized to determine if a signal was detected during the frequency scan. If no signal may have been detected, the exemplary steps may proceed to step 411, where the counter value I, may be compared to the total number of scans, N, to be performed. If in step 411, the total number of scans may not have been reached, the process may proceed to step 413 where I may be incremented by 1 before proceeding back to step 405.

If in step 409 a signal may be detected, the exemplary steps may proceed to step 417 where the type of signal may be determined by the bandwidth of the received signal. If the bandwidth indicates a BT page/inquiry signal, the process may proceed to step 419 where a BT page/inquiry scan may be initiated followed by end step 421. If in step 417, the BW may indicate that the received signal is not a BT page/inquiry signal, the exemplary steps may proceed to step 418. If in step 418, another signal may be present, the process may proceed to step 417 to again assess whether the received signal may be a BT page/inquiry signal. But, if in step 418, another signal may not have been detected, the process may proceed to step 411, where the counter I, may be compared to the total number of scans, N, to be performed. In instances where the counter I may be equal to N, the process may proceed to step 415 where the process may wait until the next sweep start time is reached, at which time another frequency sweep may be initiated by proceeding to step 403 to start the process over.

In an embodiment of the invention, a method and system are disclosed for controlling one or more scans 200 of a received signal 321 detection frequency across a frequency range and storing a magnitude of the received signal at each frequency where the magnitude exceeds a threshold level 325. A type of one or more signals in the received signal may be determined based on a bandwidth of the signals. A Bluetooth page/inquiry scan may be initiated in instances where the determined signal type may be a page/inquiry signal 233, and scans may be continued if the determined type may not be a page/inquiry signal 233. The scans 220 may be repeated on a periodic basis and may be controlled utilizing a voltage controlled oscillator. Each of the scans 200 may comprise a plurality of discrete frequency steps or a continuous frequency ramp. The controlling may comprise a start frequency 329, an end frequency 331 and a frequency step size 333 for the scans 200.

Certain embodiments of the invention may comprise a machine-readable storage having stored thereon, a computer program having at least one code section for a continuing scan in a Bluetooth wireless system, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a Bluetooth radio:
   controlling a scan of a received signal within a frequency range;
   storing, as a signal profile, a respective magnitude of said received signal at each frequency when each magnitude exceeds a threshold level, each magnitude that exceeds the threshold level being associated with a corresponding signal in said received signal;
   determining a respective bandwidth associated with each signal in said received signal;
   determining a respective type of each signal in said received signal based at least upon whether the respective bandwidth of the corresponding signal is greater than a defined bandwidth value, wherein the respective type of each signal is determined to be a Bluetooth signal when the corresponding bandwidth is determined to be less than the defined bandwidth value, wherein the respective type of each signal is determined to be an interferer signal when the corresponding bandwidth is determined to be greater than the defined bandwidth value;
   initiating a Bluetooth page/inquiry scan when the determined type corresponds to a Bluetooth signal; and
   controlling the scan for identifying an additional signal in said received signal, wherein the respective type of the additional signal is determined based at least in part upon the signal profile.

2. The method according to claim 1, wherein controlling the scan comprises continuing the scan if said determined type is not a Bluetooth page/inquiry signal.

3. The method according to claim 1, comprising repeating the scan on a periodic basis.

4. The method according to claim 1, comprising controlling the scan utilizing a voltage controlled oscillator.

5. The method according to claim 1, wherein the scan comprises a plurality of discrete frequency steps.

6. The method according to claim 1, wherein the scan comprises a continuous frequency ramp.

7. The method according to claim 1, wherein the scan is initiated from a start frequency for said scan.

8. The method according to claim 7, wherein the scan is initiated over a particular frequency comprising said start frequency and an end frequency.

9. The method according to claim 1, comprising controlling a frequency step size for the scan.

10. A system for wireless communication, the system comprising:
    one or more circuits in a Bluetooth radio that control a scan of a received signal within a frequency range;
    said one or more circuits that store, as a signal profile, a magnitude of said received signal at a frequency where said magnitude exceeds a threshold level, wherein said magnitude corresponds to a presence of a signal in said received signal;
    said one or more circuits that determine a bandwidth of the signal in said received signal;

said one or more circuits that determine a type of the signal in said received signal, wherein the type of the signal is determined to be a Bluetooth signal when the bandwidth is determined to be less than a defined bandwidth value; and said one or more circuits that determine whether to initiate a Bluetooth page/inquiry scan when the determined type corresponds to a Bluetooth signal; and said one or more circuits that continue the scan for identifying an additional signal in said received signal, wherein a type of the additional signal is determined based at least in part upon the signal profile.

11. The system according to claim 10, wherein the system further comprises one or more circuits that continue the scan if the determined type is not a Bluetooth page/inquiry signal.

12. The system according to claim 10, wherein the system further comprises one or more circuits that repeat the scan on a periodic basis.

13. The system according to claim 10, wherein the system further comprises one or more circuits that control the scan utilizing a voltage controlled oscillator.

14. The system according to claim 10, wherein the scan comprises a plurality of discrete frequency steps.

15. The system according to claim 10, wherein the scan comprises a continuous frequency ramp.

16. The system according to claim 10, wherein the scan is initiated from a start frequency for said scan.

17. The system according to claim 16, wherein the scan is initiated over a particular frequency comprising said start frequency and an end frequency.

18. The system according to claim 10, wherein said controlling comprises a frequency step size for the scan.

19. A system for wireless communication, the system comprising:

one or more circuits configured to sense a received signal by scanning a frequency range;

one or more circuits configured to compare a magnitude of a signal part in the received signal to a reference threshold level to determine a presence of the signal part;

one or more circuits configured to determine a bandwidth of the signal part in said received signal;

said one or more circuits configured to store, in a memory, a signal profile associated with the signal part, the signal profile comprising the magnitude and a frequency corresponding to the magnitude;

one or more circuits configured to determine a type of signal part based at least upon the bandwidth and the signal profile; and one or more circuits configured to initiate a page/inquiry scan in response to a determination that the type of the signal part corresponds to a Bluetooth signal type.

20. The system according to claim 19, wherein the one or more circuits configured to sense the received signal comprises a phase locked loop (PLL) configured to operate in an open-PLL mode, wherein the PLL refrains from locking onto frequencies of the scan.

21. The system according to claim 19, further comprising one or more circuits configured to continue scanning the frequency range for an additional signal part in the received signal subsequent to a storing of the signal profile in the memory.

* * * * *